No. 864,823. PATENTED SEPT. 3, 1907.
J. S. BARNES.
VARIABLE SPEED GEARING.
APPLICATION FILED JUNE 4, 1907.

2 SHEETS—SHEET 1.

Witnesses:
C. B. Clark
E. Behel.

Inventor:
John S. Barnes.
By A. O. Behel.
Attys.

No. 864,823. PATENTED SEPT. 3, 1907.
J. S. BARNES.
VARIABLE SPEED GEARING.
APPLICATION FILED JUNE 4, 1907.

2 SHEETS—SHEET 2.

Witnesses:
C. B. Clark
E. Behel.

Inventor:
John S. Barnes
By A. O. Behel
Atty.

UNITED STATES PATENT OFFICE.

JOHN S. BARNES, OF ROCKFORD, ILLINOIS, ASSIGNOR TO W. F. & JOHN BARNES COMPANY, OF ROCKFORD, ILLINOIS, A CORPORATION OF ILLINOIS.

VARIABLE-SPEED GEARING.

No. 864,823.

Specification of Letters Patent.

Patented Sept. 3, 1907.

Application filed June 4, 1907. Serial No. 377,260.

*To all whom it may concern:*

Be it known that I, JOHN S. BARNES, a citizen of the United States, residing at Rockford, in the county of Winnebago and State of Illinois, have invented certain new and useful Improvements in Variable-Speed Gearing, of which the following is a specification.

The object of this invention is to impart variable speeds to a driven member from a driving member.

Figure 1:
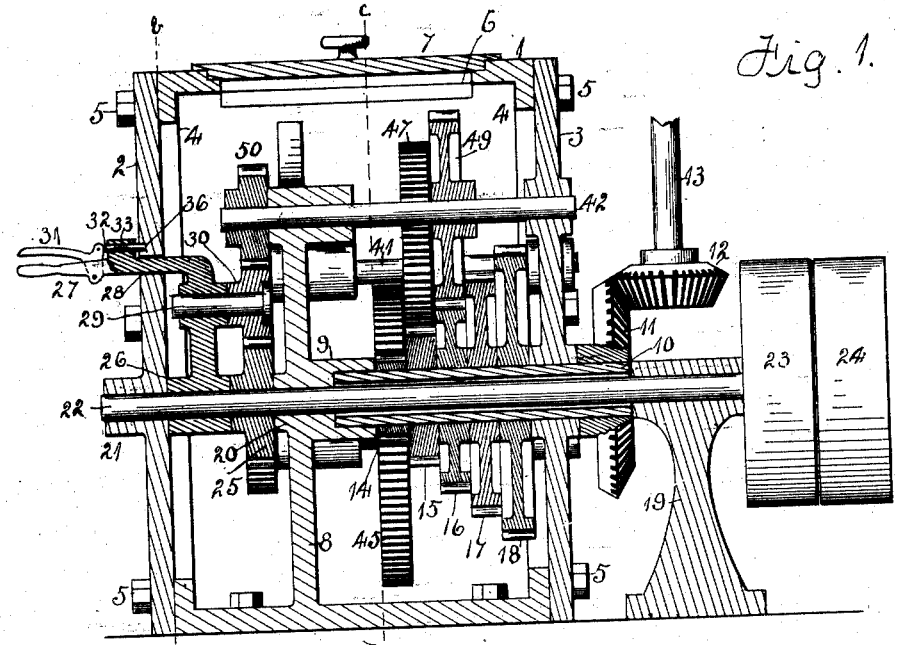
Figure 2:
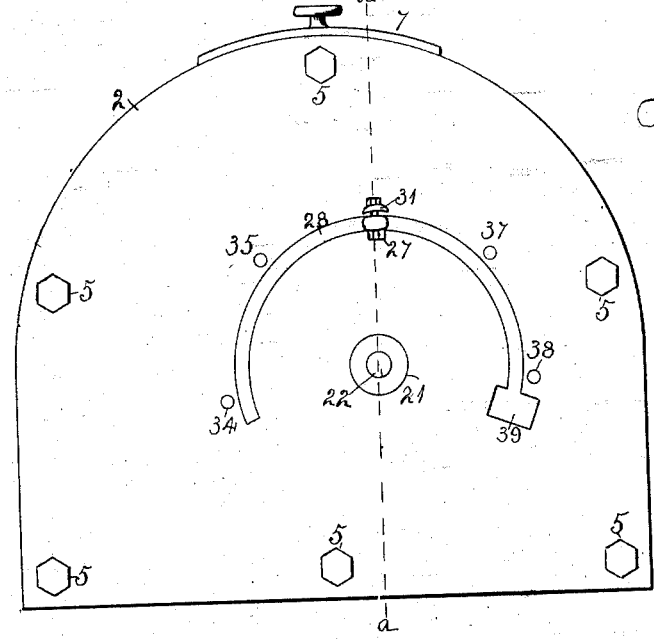
Figure 3:
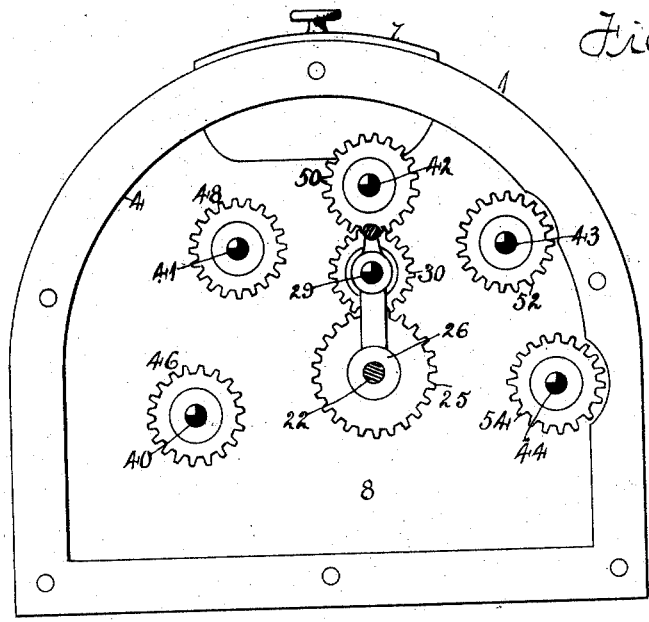
Figure 4:
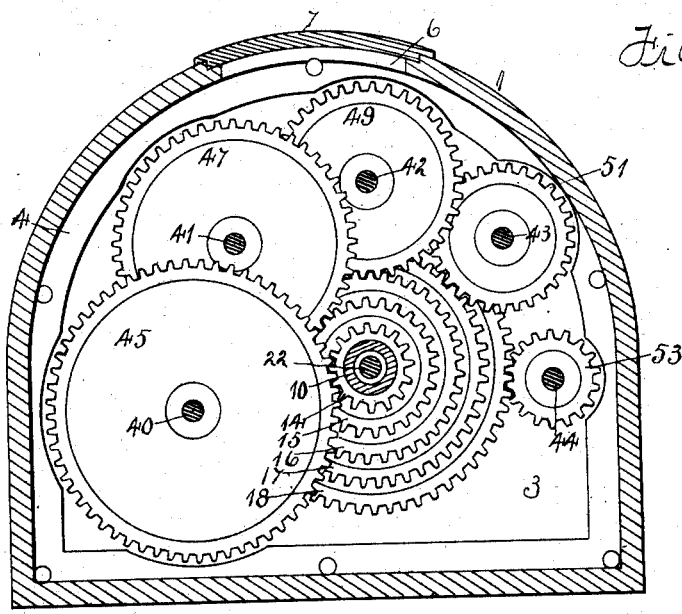

In the accompanying drawings. Figure 1 is a vertical section on dotted line *a a* Fig. 2. Fig. 2 is an end elevation as seen from the end supporting the operating lever. Fig. 3 is a vertical transverse section on dotted line *b b* Fig. 1. Fig. 4 is a vertical transverse section on dotted line *c c* Fig. 1.

The operative parts of my improved variable speed gearing are located and supported within the suitable casing comprising the center 1, and ends 2 and 3. The ends are connected to the inturned flanges 4 of the center section by the screws 5. The center section has an opening 6 in its top portion which is closed by the removable cover 7. The center section has a vertical partition 8, which is provided with a tubular bearing 9 extending from one face.

A tubular shaft 10 has one end supported by the tubular bearing 9, and its other end supported by the end 3. To the end of the tubular shaft projecting beyond the end 3 is fixedly connected a bevel gear 11 which meshes with a bevel pinion 12 connected to the driven shaft 13. To the tubular shaft 10 are fixedly connected, in this instance, five spur gears 14, 15, 16, 17, and 18 of varying diameters.

Near the end 3 of the casing is located a bearing 19 which in conjunction with a bearing 20 formed in the vertical partition 8, and a bearing 21 formed in the end 2 of the casing, supports a driving shaft 22, and this driving shaft supports a tight pulley 23 and a loose pulley 24. This driving shaft is located within the tubular shaft 10, but supported independently thereof. To the driving shaft 22 is fixedly connected a spur gear 25 which is located between the vertical partition 8 and the end 2 of the casing.

On the driving shaft 22 is loosely mounted a support 26 having a handle portion 27 extending at substantially right angles thereto, and projecting through a segmental opening 28 in the end 2 of the casing. This support 26 has a stud 29 extending from it, on which is loosely mounted an intermediate spur gear 30, which is in constant mesh with the spur gear 25. The hand lever 27 is provided with a thumb latch 31 which operates on a reciprocating pin 32 held in proper position by the lug 33. The outer face of the end 2 is provided with five recesses 34, 35, 36, 37 and 38 within which the pin 32 may be seated. The segmental opening 28 has an enlargement 39 at one end, which permits the end to be placed over the hand lever 27 and thumb latch 31.

The end 3 and vertical partition 8 support five shafts 40, 41, 42, 43 and 44, in a manner to permit them to rotate freely. The shaft 40 has a spur gear 45 fixedly connected to it, which meshes with the spur gear 14 connected to the tubular shaft 10, and to this shaft is also connected a spur gear 46 which is located in the same vertical plane with the spur gear 25. The shaft 41 has a spur gear 47 fixedly connected to it, which meshes with the spur gear 15 connected to the tubular shaft 10, and to this shaft is also connected a spur gear 48 which is located in the same vertical plane with the spur gear 25. The shaft 42 has a spur gear 49 fixedly connected to it, which meshes with the spur gear 16 connected to the tubular shaft 10, and to this shaft is also connected a spur gear 50 which is located in the same vertical plane with the spur gear 25. The shaft 43 has a spur gear 51 fixedly connected to it, which meshes with the spur gear 17 connected to the tubular shaft 10, and to this shaft is also connected a spur gear 52 which is located in the same vertical plane with the spur gear 25. The shaft 44 has a spur gear 53 fixedly connected to it, which meshes with the spur gear 18 connected to the tubular shaft 10, and to this shaft is also connected a spur gear 54 which is located in the same vertical plane with the spur gear 25.

As seen at Fig. 3, the intermediate spur gear 30 is in mesh with the spur gears 25 and 50, thereby forming a driving connection between the driving shaft 22 and the driven shaft 13, through the spur gear 50, shaft 42, spur gears 16 and 49, tubular shaft 10, and bevel gears 11 and 12. Should the intermediate spur gear 30 be moved into mesh with the spur gears 25 and 48, a different speed will be imparted to the driven shaft through the shaft 41, spur gears 47 and 15, tubular shaft 10 and bevel gears 11 and 12. This intermediate spur gear can be moved to form a connection between the spur gear 25, and any one of the spur gears 46, 48, 50, 52 and 54, thereby imparting five different speeds to the driven shaft.

It will be noticed that when the tubular shaft is rotated by any one of the connections above described, all the shafts 40, 41, 42, 43 and 44 are rotating idly with the exception of the one that is doing the driving.

By means of the thumb latch 31, the pin 32 can be inserted in any one of the recesses 34, 35, 36, 37 and 38, which will hold the intermediate spur gear in mesh with any one of the spur gears 46, 48, 50, 52 and 54.

The change of speed can be made while the driving shaft 22 is rotating, as the intermediate spur gear will free one of the spur gears 46, 48, 50, 52 and 54, before it engages another of said gears.

The speed change gearing can be used for various purposes, but the use for which I have especially designed it, is for imparting different speeds to a drill of a drilling machine.

I claim as my invention.

1. In a variable speed gearing, the combination of a driving member, and a driven member, of a plurality of spur gears fixedly connected to the driven member, a plurality of shafts arranged equi-distant from the driven member, a spur gear fixedly connected with each shaft and meshing with one of the spur gears connected to the driven member, a spur gear on the driving member, a secondary spur gear connected to each shaft, and an intermediate spur gear in constant mesh with the spur gear on the driving member and capable of being moved into mesh with any one of the secondary spur gears of the shafts.

2. In a variable speed gearing, the combination of a driving member, and a driven member, of a plurality of spur gears fixedly connected to the driven member, a plurality of shafts arranged equi distant from the driven member, a spur gear fixedly connected with each shaft and meshing with one of the spur gears connected to the driven member, a spur gear on the driving member, a secondary spur gear connected to each shaft, an intermediate spur gear in constant mesh with the spur gear on the driving member and capable of being moved into mesh with any one of the secondary spur gears on the shafts, and means for holding the intermediate spur gear in mesh with any one of the secondary spur gears.

In testimony whereof I have hereunto set my hand in presence of two subscribing witnesses.

JOHN S. BARNES.

Witnesses:
A. O. BEHEL,
E. D. E. N. BEHEL.